United States Patent [19]

Wesner

[11] Patent Number: 4,476,202

[45] Date of Patent: Oct. 9, 1984

[54] TWO-PIECE COVER-SEAL CONSTRUCTION FOR GALVANIC CELLS

[75] Inventor: John A. Wesner, Avon Lake, Ohio

[73] Assignee: Union Carbide Corporation, Danbury, Conn.

[21] Appl. No.: 391,421

[22] Filed: Jun. 23, 1982

[51] Int. Cl.³ .................. H01M 2/04; H01M 2/36
[52] U.S. Cl. .................................. 429/94; 429/174; 429/177
[58] Field of Search ............... 429/94, 52, 72, 172, 429/174, 177, 163, 164, 165, 166, 170, 167, 168, 169, 171, 172, 185

[56] References Cited

U.S. PATENT DOCUMENTS

| 2,712,565 | 7/1955 | Williams | 136/107 |
|---|---|---|---|
| 3,081,367 | 3/1963 | Field et al. | 429/94 |
| 3,470,025 | 9/1969 | Yehiely | 429/94 |
| 3,475,226 | 10/1969 | Fraioli | 429/72 |
| 3,852,117 | 12/1974 | Fraioli | 429/174 |
| 3,891,462 | 6/1975 | Langkau | 136/111 |
| 3,945,846 | 3/1976 | Dey | 136/100 R |
| 4,048,405 | 9/1977 | Megahed | 429/206 |
| 4,091,188 | 5/1978 | Dey | 429/174 |

FOREIGN PATENT DOCUMENTS 2100917 6/1981 United Kingdom .

Primary Examiner—Donald L. Walton
Attorney, Agent, or Firm—William E. Dickheiser

[57] ABSTRACT

A two-piece cover for galvanic cells wherein the inner cover has at least one aperture therein through which electrolyte may be quickly dispensed and absorbed into a container having cell components therein in a manner which effectively prevents the sealing surfaces of the cell from being wetted by electrolyte.

12 Claims, 4 Drawing Figures

TWO-PIECE COVER-SEAL CONSTRUCTION FOR GALVANIC CELLS

DESCRIPTION

1. Technical Field

This invention relates to the sealing of galvanic cells and specifically to a two-piece cover for galvanic cells wherein the inner cover has at least one aperture therein through which electrolyte may be rapidly dispensed and quickly absorbed into a container having cell components therein in a manner which effectively prevents the sealing surfaces of the cell from becoming wetted with electrolyte.

2. Background Art

A continuing concern in the manufacture of galvanic cells is that electrolyte may creep through a sealed interface of the cell and leak out of the cell. Electrolyte leakage may shorten cell life and can also cause a corrosive deposit to form on the exterior surface of the cell which detracts from the cell's appearance and marketability. These corrosive salts may also damage the device in which the cell is housed. Electrolyte leakage occurs in cell systems having aqueous or nonaqueous electrolytes, organic solvent-based electrolytes and liquid inorganic cathode-electrolytes such as those based on thionyl chloride and sulfuryl chloride. Electrolytes such as alkaline electrolytes have an affinity for wetting metal surfaces and are known to creep through a sealed interface of a galvanic cell.

Generally galvanic cells comprise a negative electrode, a positive electrode, a separator therebetween and an electrolyte in ionic contact with the negative and positive electrodes, housed in a container and cover assembly and provided with sealing means, such as a gasket, disposed between the container and cover assembly. The sealing gasket provides a primary barrier to electrolyte leakage. Much effort has been devoted to the design of sealing gaskets.

It is known in the prior art to provide stable long lasting sealing means by constructing a long tortuous path that electrolyte must traverse before reaching the exterior of the cell. An example of this approach is the double cell cover disclosed in U.S. Pat. No. 2,712,565 wherein the top closure of a galvanic cell comprises a pair of metal discs in contact at their centers and slightly separated at their peripheral edges so that electrolyte must travel past the interface between the sealing gasket and the first disc, along the top of the first disc until it contacts the bottom surface of the second disc, then along the bottom of the second disc, and past the interface between the sealing gasket and the second disc before it reaches the exterior of the cell.

The double cell cover shown in U.S. Pat. No. 4,048,405 shows the two covers spot welded together at their centers prior to mating with other cell components.

Such prior art attempts to prevent electrolyte leakage do not consider that the manner in which electrolyte is added to the cell may contribute to cell leakage. If the seal area of a cell, either the surface of a sealing gasket or the surface of a container or cover against which the gasket seals, becomes wet with electrolyte when the electrolyte is being introduced into the container, the wetted surface may be corroded and the effectiveness of the seal deteriorated. This is especially so when electrolyte is added to a galvanic cell by dispensing a required volume of electrolyte into an open container already housing cell components, which are the positive and negative electrodes and separator, and with or without a sealing gasket disposed along the inside periphery of the container sidewall. Under such circumstances the electrolyte is initially disposed above the other cell components and in contact with the upper portion of the container sidewall and the surfaces of the sealing gasket if one is present. Electrolyte that remains in the interface between the container sidewall and the sealing gasket or in the interface between the cover assembly and the sealing gasket after the cell is sealed contributes to cell leakage either by providing a wicking path for electrolyte creepage or by corroding the container sidewall or cover which in turn leads to electrolyte leakage.

Another disadvantage inherent to prior art methods for assembling cells by dispensing electrolyte into containers having cell components therein is the time which is required for the electrolyte to soak into and around the cell components. Electrolyte slowly displaces the air within the container and cell components therein and is absorbed around and by the cell components. Further assembly of the cell is suspended to prevent electrolyte loss or spillage which could otherwise take place in subsequent sealing steps. Electrolytes typically require on the order of from about one to about five minutes for an electrolyte volume of from about 0.3 to about 0.5 cubic centimeters to soak around and into the cell components.

So as not to completely immobilize the partially assembled cell, the electrolyte is sometimes dispensed into the container in a number of smaller volumes which permit movement of the container but do not reduce the overall time required for the electrolyte to soak into the cell components, nor can subsequent assembly steps be undertaken until all of the electrolyte has been absorbed. Thus, the present method of dispensing electrolyte into partially assemblied cells is very time consuming.

Ultraminiature cells sometimes utilize a hypodermic needle as a current collector and conduit for injecting a measured liquid electrolyte into the sealed cell, as in U.S. Pat. Nos. 3,945,846 and 4,091,188. These ultraminiature cells generally contain high energy density components which require special handling and assembling techniques. Due to their size, ultraminiature cells are not amenable to the earlier described methods of dispensing electrolyte into an open, partially assembled cell.

It would be a substantial contribution to the art of sealing galvanic cells to provide means for quickly dispensing electrolyte into a partially assembled cell without wetting the sealing surfaces of the cell. Therefore, it is an object of the present invention to provide a sealed galvanic cell wherein electrolyte is dispensed into the cell without wetting sealing surfaces.

It is another object of the present invention to provide a substantially leak proof galvanic cell.

Another object of the present invention is to provide a cover assembly which provides means for quickly dispensing electrolyte into a container having cell components therein and which effectively maintains the sealing surfaces of the cell free of electrolyte.

It is another object of this invention to provide a method for effectively preventing electrolyte from wetting the sealing surfaces of a galvanic cell when the electrolyte is dispensed into the cell.

A further object of the invention is to provide a method for electrolyte to be quickly absorbed around and into the cell components of a galvanic cell.

The foregoing and additional objects of this invention will become apparent from the following description and accompanying drawings and examples.

DISCLOSURE OF INVENTION

The invention relates to a sealed galvanic cell comprising a container having a base, a sidewall and an open end and housing a first electrode in electrical contact with the container, a second electrode, a separator therebetween and an electrolyte therein in ionic contact with the first electrode and the second electrode; a cover assembly disposed at the open end of the container and in electrical contact with the second electrode; and a sealing gasket compressively disposed between the container sidewall and the cover assembly; the improvement wherein said cover assembly comprises an inner cover having at least one aperture therein through which electrolyte can be dispensed into the container and an outer electrically conductive cover secured within the gasket and container.

This invention also relates to a method of manufacturing a sealed galvanic cell comprising the steps of:

(a) assembling a positive electrode, a separator, and a negative electrode in a container having a base, an upright sidewall and an open end;

(b) disposing a sealing gasket and an inner cover having at least one aperture therethrough at the open end of the container with the periphery of the inner cover being contiguous with the sealing gasket;

(c) evacuating air out of the cell container through the at least one aperture in the inner cover;

(d) dispensing electrolyte into the container through the at least one aperture in the inner cover and then readmitting air;

(e) placing an outer cover over the inner cover at the open end of the container and which outer cover is in electrical contact with one electrode of the cell; and (f) sealing the cell by applying conventional external forces.

In the preferred embodiment of the invention electrolyte is dispensed through one aperture in an inner cover into a container having a first electrode, a separator and a second electrode therein from which most of the air has been removed. An outer cover is then placed over the inner cover and the cell sealed. Generally, the first electrode in electrical contact with the container is positive and the second electrode in electrical contact with the cover assembly is negative.

Prior to dispensing the electrolyte a positive electrode, a separator and a negative electrode are positioned in a container. A sealing gasket which typically comprises an upright vertical sidewall and a radially inwardly extending flange is inserted into the container. An inner cover having at least one aperture therethrough is disposed at the open end of the container. The periphery of the inner cover rests preferably on the flange of the sealing gasket.

The at least one aperture in the inner cover provides means for evacuating air from the container. An aperture is typically circular having a radius of from about 0.03 inch (0.08 cm) to about 0.06 inch (0.15 cm). Preferably, for inner covers having radii of 0.5 inch (1.27 cm) and smaller there is one aperture in the center of the inner cover which aperture has a radius of about 0.045 inch (0.114 cm). The inner cover is held against the sealing gasket flange to form a temporary seal. Once this seal is formed air in the container is evacuated and electrolyte is dispensed into the container. This seal prevents electrolyte from wetting the sealing surfaces of the sealing gasket and the inner cover. Since the sealing gasket is already positioned inside the container, electrolyte is precluded from wetting the sealing surfaces between the container sidewall and the sealing gasket. A vacuum on the order of about 20 mm Hg is preferred for removal of most of the air from within the container.

Once the container has been evacuated through the aperture in the inner cover, electrolyte can be dispensed through the same aperture. The vacuum in the container assists the liquid electrolyte to soak into the partial cell assembly. Whereas dispensing electrolyte into the open end of an unevacuated container which houses cell components requires about one minute for 0.3 cc of electrolyte to be absorbed, the same volume of electrolyte is absorbed into an evacuated container having components therein in about two seconds.

Thus the inner cover of the present invention provides means for removing air from within the container and for quickly dispensing electrolyte into a container having cell components therein while maintaining the cell sealing surfaces in a dry, electrolyte-free condition.

Due to the aperture in the inner cover, the inner cover is not effective as a cell closure. An outer cover therefore is placed contiguously over the inner cover and is in electrical contact with one electrode in the container.

Electrical contact is required between the outer cover and one of the cell electrodes since the outer cover serves as one electrical terminal of the cell. This is generally accomplished by placing the outer cover in electrical contact with the inner cover which in turn is in electrical contact with one of the cell electrodes, generally the negative electrode. In the case of a battery which comprises a rolled configuration, that is a cylindrical battery in which a flexible negative electrode and a flexible positive electrode are rolled together with separator layers therebetween, contact is generally maintained between the inner cover and one of the electrodes by means of an electrically conductive strip or tab. The tab extends into that electrode and is attached to the inside surface of the inner cover in a manner so as not to obstruct the at least one aperture in the inner cover. The tab is often rolled with the electrodes so as to be properly positioned in the rolled configuration and subsequently spot welded to the inner cover. Spot welding can be quite hazardous with prior art cover assemblies that utilize only one cover or two or more covers mated together if the cell system utilizes a flammable electrolyte and the contact between the cover assembly and a cell electrode occurs after the electrolyte is added. In keeping with the present invention the tab can be properly positioned in the cell and welded to the inner cover prior to the introduction of electrolyte and away from the presence of electrolyte vapors. This feature of the invention is particularly useful in high energy density cells that employ flammable electrolytes such as a rolled cell configuration wherein the first electrode comprises manganese dioxide, the second electrode comprises lithium and the electrolyte is an organic solvent-based electrolyte.

Electrical contact may also be maintained directly between the outer cover and one of the cell electrodes, such as by extending the conductive tab from one electrode through an aperture in the inner cover and attaching the tab to the outer cover. When the outer cover is in direct electrical contact with a cell electrode the inner cover need not be electrically conductive.

In one embodiment of this invention the inner cover comprises a cell sealing cupped gasket having a vertical upright sidewall and a base having at least two apertures therethrough. An electrically conductive tab extends from one electrode through one of the apertures in this inner cover and is attached to the outer cover. The container having cell components therein is evacuated and electrolyte may be dispensed through one or more apertures in this inner cover which also functions as the sealing gasket of the cell. In this embodiment the inner cover is not electrically conductive. When the outer cover is placed in its assembly position the excess portion of the conductive tab is folded between the outer cover and the inner insulating cover. The inner cell cover prevents the folded portion of the tab from contacting the oppositely charged electrode and shorting the cell. The cell is sealed in a conventional fashion, compressing the sidewall portion of the inner cover between the container sidewall and the periphery of the outer cover.

The thicknesses of the inner and outer covers may be selected so as to minimize the height of the cover assembly. This is particularly important when the overall dimensions of the cell are fixed and a maximum volume must be devoted to the cell electrodes. The inner cover should have a thickness that is sufficient to sustain its integrity during the evacuation of the cell, resisting outside pressure when the pressure within the cell is approximately 20 mm Hg. An inner cover having a thickness of from about 0.001 inch (0.003 cm) to about 0.005 inch (0.013 cm) for a cell which has a radius of about 0.5 inch (1.25 cm) and smaller will generally maintain its integrity under the above-described conditions. Thicker inner covers will also perform as desired. If the inner cover is selected to have a minimal thickness that is sufficient to withstand pressure differentials when the cell is evacuated but not sufficiently strong to withstand cell sealing forces, then the outer cover is selected with a thickness such that the cover assembly will withstand radial and normal cell sealing forces without detrimental deformation. Generally an outer cover having a thickness greater than 0.006 inch (0.015 cm) is necessary to withstand cell sealing forces when the radius of the cell is 0.5 inch (1.27 cm) or smaller.

Generally, when the radius of the cell is 0.5 inch (1.27 cm) or smaller, then the inner cover has a thickness of from about 0.001 inch (0.003 cm) to about 0.005 inch (0.013 cm) and the outer cover will preferably have a thickness of from about 0.006 inch (0.015 cm) to about 0.015 inch (0.030 cm) for covers having radii of 0.5 inch (1.27 cm) and smaller. Preferably the inner cover has a thickness of about 0.005 inch (0.013 cm) and the outer cover has a thickness of about 0.010 inch (0.254 cm) when the cell has a radius of 0.5 inch (1.27 cm) or smaller.

Alternatively, the inner cover may have a thickness that is greater than 0.006 inch (0.015 cm) and will maintain its integrity under cell sealing forces. In such instances an outer cover is utilized for sealing in cell electrolyte and for providing one electrical terminal of the cell, for which functions the outer cover may be thin.

The outer cover is positioned contiguous to the inner cover after the cell electrolyte has been dispensed into the container. The cell can then be sealed in a conventional manner as by radial sealing forces which compress the sealing gasket between the container sidewall and the peripheries of the covers. Preferably sealing is completed by crimping the uppermost portion of the container sidewall inwardly over the covers.

Electrolyte leakage along the perpheries of the covers can be inhibited as by prior art disclosures in which a space is maintained between the peripheries of the inner and outer covers by inserting a separating member therebetween so as to lengthen the distance which electrolyte must travel to reach the exterior of the cell.

Electrolyte leakage through and beyond the at least one aperture in the inner cover can be substantially eliminated by disposing a sealant between the inner and outer covers around each aperture. Preferably, the sealant is chosen so as not to be wetted by the cell electrolyte. Depending on the electrolyte, the sealant may be a fatty polyamide, a polymeric silicone, asphalt or a polymeric fluorocarbon.

Suitable materials for the covers of this invention are nickel, copper, tin, steel, monel, nickel-plated steel, copper clad steel, tin clad steel and alloys and combinations thereof and other conductive materials that will not corrode or otherwise deteriorate when in contact with the cell components. Additionally, when the outer cover is in direct electrical contact with a cell electrode the inner cover need not be electrically conductive and may be a material such as a polymeric fluorocarbon, polyvinyl, polyethylene, polypropylene, polystyrene or nylon or the like.

The sealing gasket and the separating member disposed between the peripheries of the covers have to be stable in the presence of cell electrolyte and other cell materials and can be selected from such components as fluorocarbons such as polytetrafluoroethylene, fluorinated ethylene-propylene polymer, ethylene copolymer with fluorinated ethylene-propylene, polychlorotrifluoroethylene, perfluoro-alkoxy polymer; polyvinyl; polyethylene; polypropylene; polystyrene; nylon and other materials obvious to one skilled in the art.

BRIEF DESCRIPTION OF DRAWINGS

The present invention will become more apparent from the following description thereof when considered together with the accompanying drawings which are set forth as being exemplary of embodiments of the present invention and are not intended in any way, to be limitative thereof and wherein.

DETAILED DESCRIPTION OF DRAWINGS

Figure 1:
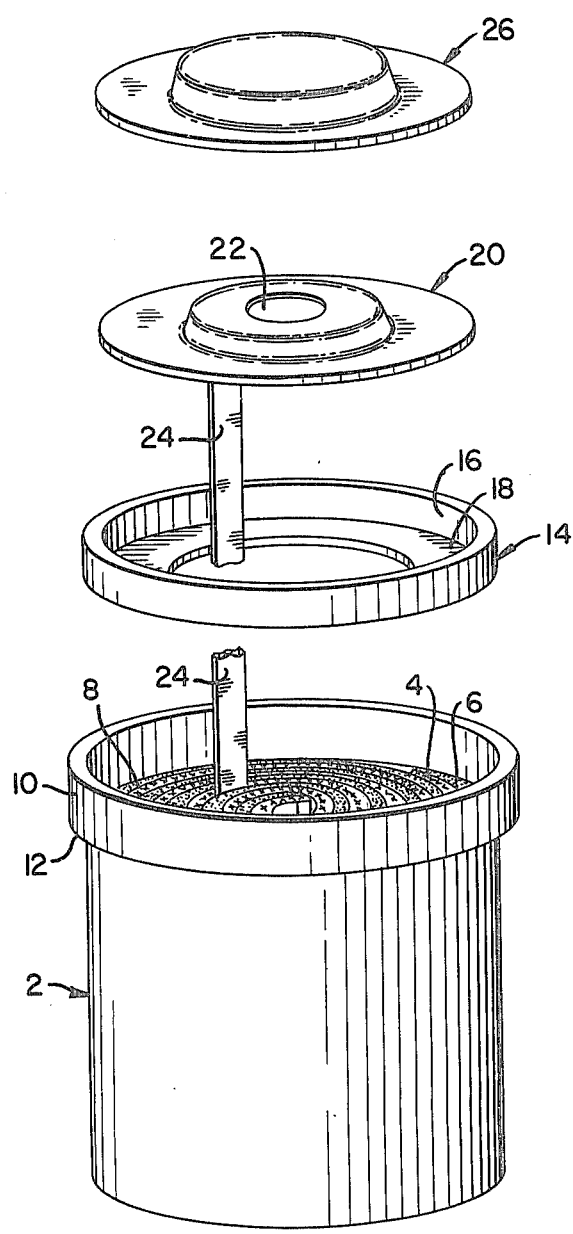
FIG. 1 is a perspective view of the components of a galvanic cell in accordance with one embodiment of this invention.

With respect to FIG. 1, there is shown therein a container 2 in which there has been inserted a rolled electrode configuration comprising a flexible negative electrode 4, a flexible positive electrode 6, separators 8 therebetween and an electrically conductive tab 24 in contact with the negative electrode and extending upward therefrom. The uppermost portion of the container sidewall 10 extends above step 12 in the container sidewall. Sealing gasket 14 is shown above the container and comprises a vertical sidewall 16 whose outward-facing surface is sized to be contiguous with the inner surface of the uppermost portion of container sidewall 10 and a radially inwardly extending flange 18 which can be seated upon the step 12 in the container sidewall 10.

Above the sealing gasket 14 there is shown an inner cover 20 having an aperture 22 through the center thereof and the end of tab 24 welded to the bottom surface of the cover 20 in a manner so as not to obstruct the aperture 22.

During assembly, the peripheral edge of the inner cover 20 is held against the flange 18 of the sealing gasket 14 forming a temporary seal. With the gasket 14 and inner cover 20 placed over the open end of the container 2, air in the rolled cell assembly is removed by evacuating through the aperture 22 in the inner cover 20. Thereafter the required volume of electrolyte is dispensed through aperture 22. The vacuum in the container 2 facilitates the absorption of electrolyte into and around the cell components.

An outer cover 26 is shown positioned over the inner cover 20. After electrolyte has been absorbed into and around the cell components in container 2 and air readmitted into the container, the outer cover 26 is placed over the inner cover 20 and the cell is sealed by radially compressing the sidewall 16 of the sealing gasket 14 between the uppermost portion of the container sidewall 10 and the peripheries of the inner and outer covers 20 and 26.

In this manner a two-piece cover is provided which permits rapid dispensing and absorption of electrolyte into a container having cell components therein while maintaining the sealing surfaces of the cell essentially electrolyte-free so as to obtain an effectively leak proof cell.

Figure 2:
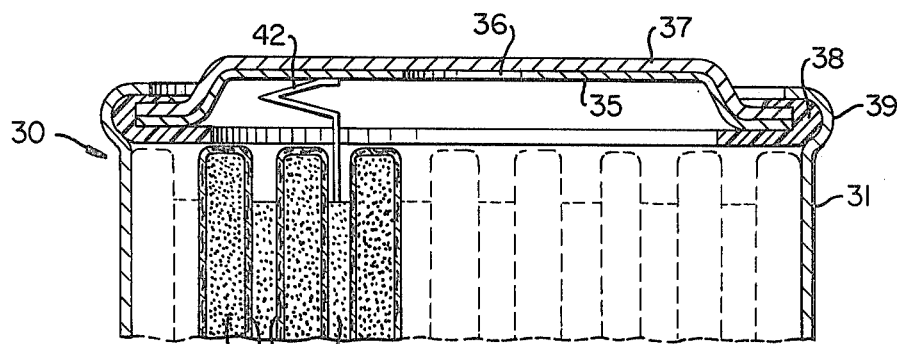
FIG. 2 is a partial sectional side elevation view taken through an assembled cell in accordance with one embodiment of this invention wherein the inner cover has one aperture therethrough.

There is shown in FIG. 2 a partial side elevation view of an assembled cell identified by reference number 30 in accordance with one embodiment of this invention. A container 31 is shown wherein is housed a rolled positive electrode 32, a rolled negative electrode 33 and rolled separators 34 therebetween.

The cover assembly comprises a thin inner cover 35 having an aperture 36 in the center thereof through which air has been evacuated out of the container 31 and electrolyte dispensed into the container 31, and a thicker outer cover 37 which is capable of withstanding cell sealing forces without detrimentally deforming. A conductive tab 42 is secured to the negative electrode 33 and spot welded to the inner cover 35 to provide electrical contact therewith. The inner cover is in intimate contact with the outer cover which serves as the negative terminal of the cell. A sealing gasket 38 is compressively disposed between the container sidewall 39 and the peripheries of the covers 35 and 37.

Figure 3:
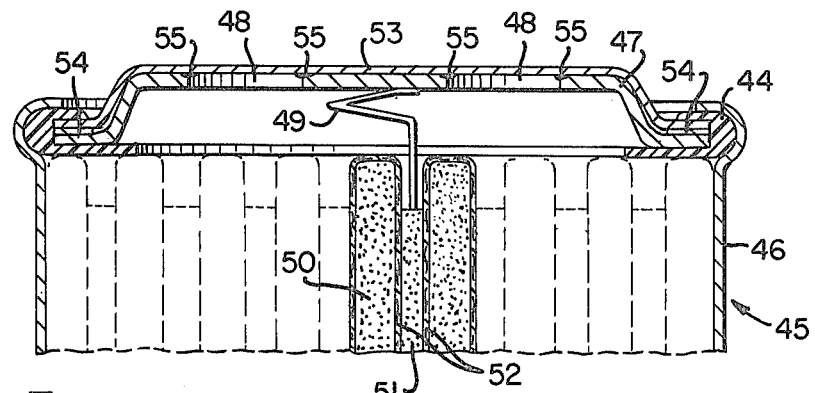
FIG. 3 is a partial sectional side elevation view taken through an assembled cell in accordance with an alternative embodiment of this invention wherein the inner cover has two apertures, is separated from the outer cover at their peripheries and has a sealant around each aperture.

FIG. 3 shows an alternative embodiment of this invention. There is shown a partial cross sectional elevation of an assembled cell identified by reference number 45 having a container 46 which houses a rolled positive electrode 50, a rolled negative electrode 51 and rolled separators 52 therebetween. An inner cover 47 is shown having two apertures 48 therethrough. An electrically conductive tab 49 extends downward from the inner cover 47 to the negative electrode 51 to provide electrical contact between the inner cover 47 and the negative electrode 51. During assembly air is evacuated out of the container 46 and electrolyte inserted into the container 46 through the apertures 48. The inner cover 47 is of sufficient thickness to withstand conventional sealing forces such as radial sealing forces.

An outer cover 53 is disposed over the inner cover 47 for sealing purposes and is separated from the inner cover 47 at their peripheries by a separating member 54. A sealant 55 is disposed between the covers and encompasses the apertures 48 in inner cover 47. The separating member and sealant are included to inhibit electrolyte leakage. The outer cover 53 is thin and provides a seal against electrolyte leakage. The outer cover 53 is in electrical contact with the inner cover 47 at the shoulder portion of the covers, the outer cover 53 functioning as the negative terminal of the cell.

Figure 4:
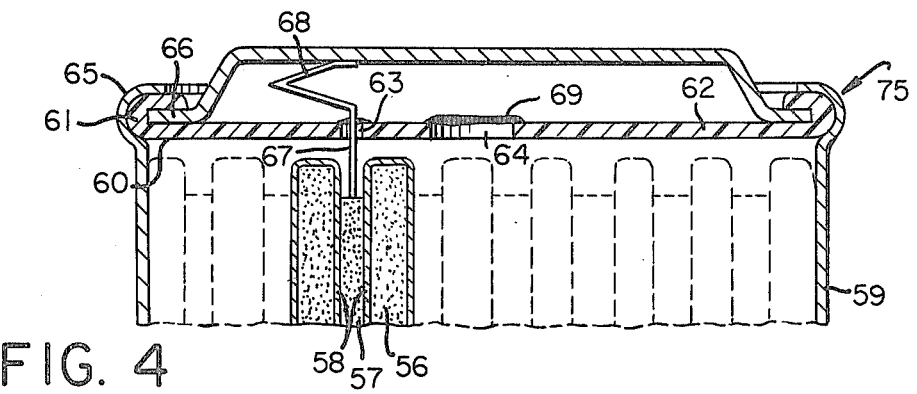
FIG. 4 is a partial sectional side elevation view taken through an assembled cell in accordance with an alternative embodiment of this invention wherein the inner cover comprises a sealing gasket having an upright sidewall and a base with two apertures therethrough.

Still another embodiment of this invention is shown in FIG. 4. There is shown in partial cross sectional elevation an assembled cell 75 having a rolled positive electrode 56, a rolled negative electrode 57 and rolled separators 58 therebetween housed in a container 59. An electrically insulating inner cover 60 comprises a sidewall portion 61 which is compressively disposed between the container sidewall 65 and the periphery of outer cover 66 and a base portion 62 having two apertures 63 and 64 therethrough. An electrically conductive tab 67 secured to the negative electrode 57 extends through aperture 63 in the inner cover 60 and is attached to the inner surface of the outer cover 66. The conductive tab folded portion 68 is disposed in the space between the inner cover 60 and the outer cover 66. Because of the electrically insulating characteristic of this inner cover 60 the folded tab portion 68 cannot short the cell by contacting a portion of the positive electrode 56.

Evacuation of the container and dispensing of electrolyte into the container is through apertures 63 and 64. A sealant 69 is shown placed over the apertures 63 and 64 to inhibit electrolyte passage beyond the apertures 63 and 64.

EXAMPLE

Cells were produced in accordance with the previously described invention and as shown in FIGS. 1 and 2. A container having a 0.447 inch (1.135 cm) outer diameter and 0.420 inch (1.067 cm) high was filled with a rolled electrode configuration which comprised a lithium negative electrode layer and a manganese dioxide positive electrode layer rolled together and separated from each other by polypropylene separators.

A polyester sealing gasket was inserted into the container. An inner cover having a 0.413 inch (1.049 cm) outer diameter and a 0.005 inch (0.013 cm) thickness and a 0.090 inch (0.229 cm) diameter aperture in the center thereof was pressed against the flange of the sealing gasket. Air within the container was evacuated in less than 1 second to about 20 mm Hg through the aperture in the cover, after which about 0.3 cc of a flammable organic solvent-based electrolyte was dispensed through the aperture and absorbed into and around the electrodes in about one-half second. Air was than readmitted into the container.

An outer cover having a 0.413 inch (1.049 cm) outer diameter and a thickness of 0.010 inch (0.254 cm) was placed over the inner cover and the assembly was sealed by radially compressing the sealing gasket between the container sidewall and the peripheries of the covers and by curling the top edge of the container sidewall over the cover peripheries.

Control cells housed in a similar size container and utilizing the same electrodes and electrolyte were manufactured using the prior art method of dispensing electrolyte into the open end of a partially assembled cell. As usual with prior art methods, electrolyte contaminated the sealing surfaces of the container sidewall and the sealing gasket. Approximately two minutes were required for the electrolyte to soak into and around the rolled electrodes before the cell could be sealed. A single cover comprised the cover assembly.

All the cells were stored under various temperature and humidity conditions and monitored for electrolyte leakage. The results are displayed in Table 1. As can be seen from the Table, no cells manufactured in accordance with the two cover assembly of this invention have exhibited any leakage, whereas control cells having a conventional cover and assembled in a prior art manner have leaked.

It is to be understood that modifications may be made to the above specification without departing from the spirit of the invention as set forth in the appended claims. Such modifications are within the scope of this invention.

TABLE 1

CELL LEAKAGE UNDER VARIOUS CONDITIONS

| Test Conditions | | Total Percent Leakage | |
|---|---|---|---|
| | | Control | Two Cover |
| Cyclic Testing | | | |
| −20° C. to 71° C. | 25 cycles | 0 | 0 |
| 1 hour per cycle | 50 | 8 | 0 |
| | 75 | 15 | 0 |
| | 100 | 15 | 0 |
| 71° C. | | 20 | 0 |
| Eight Weeks | | | |
| 60° C. | | 0 | 0 |
| 90% Relative Humidty | | | |
| Four Weeks | | | |

I claim:

1. A sealed galvanic cell comprising a container having a base, a sidewall and an open end and housing a first electrode in electrical contact with said container, a second electrode, a separator therebetween and an electrolyte therein in ionic contact with said first electrode and said second electrode; a cover assembly disposed at the open end of said container and in electrical contact with said second electrode; and a sealing gasket compressively disposed between said container sidewall and said cover assembly; the improvement wherein said cover assembly comprises an inner cover having at least one aperture therein through which electrolyte can be dispensed into said container and an outer electrically conductive cover which is positioned contiguously over said inner cover and which is secured within said gasket and said container.

2. The sealed galvanic cell in accordance with claim 1 wherein the inner cover has one aperture.

3. The sealed galvanic cell in accordance with claim 1 wherein a sealant which encompasses the at least one aperture in said inner cover is disposed between the inner cover and the outer cover.

4. The sealed galvanic cell in accordance with claim 1 wherein a separating member is disposed between the peripheries of said inner cover and said outer cover.

5. The sealed galvanic cell in accordance with claim 1 wherein an electrically conductive tab is secured to the inner cover and extends to and is in electrical contact with one of the cell electrodes.

6. The sealed galvanic cell in accordance with claim 1 wherein said cell has a rolled electrode configuration.

7. The sealed galvanic cell in accordance with claim 1 or 6 wherein the first electrode comprises manganese dioxide, the second electrode comprises lithium and the electrolyte is an organic solvent-based electrolyte.

8. A sealed galvanic cell comprising a container having a base, a sidewall and an open end and housing a first electrode in electrical contact with said container, a second electrode, a separator therebetween and an electrolyte therein in ionic contact with said first electrode and said second electrode and a cover assembly disposed at the open end of said container and in electrical contact with said second electrode; the improvement wherein said cover assembly has an inner cover comprising a sealing gasket having an upright sidewall and a base through which are at least two apertures and an electrically conductive outer cover secured within said gasket and said container which outer cover does not define any apertures thereby closing the cell.

9. The sealed galvanic cell in accordance with claim 8 wherein an electrically conductive tab is secured to the outer cover and extends to and is in electrical contact with one of the cell electrodes.

10. The sealed galvanic cell of claim 1 wherein said cell has been manufactured utilizing a method comprising the steps of:
    (a) assembling a positive electrode, a separator, and a negative electrode in a container having a base, an upright sidewall and an open end;
    (b) disposing a sealing gasket and an inner cover having at least one aperture therethrough at the open end of the container with the periphery of the inner cover being contiguous with the sealing gasket;
    (c) evacuating air out of the cell container through the at least one aperture in the inner cover;
    (d) dispensing electrolyte into the container through the at least one aperture in the inner cover and then readmitting air;
    (e) placing an outer cover over the inner cover at the open end of the container, which outer cover is in electrical contact with one electrode of the cell; and
    (f) sealing the cell by applying conventional external forces.

11. The sealed galvanic cell of claim 10 wherein prior to step (c) an electrically conductive tab is attached to one cell electrode and to said inner cover.

12. The sealed galvanic cell of claim 10 wherein prior to step (e) a sealant is disposed on the outer surface of said inner cover which sealant encompasses the at least one aperture in the inner cover.

* * * * *